(12) United States Patent  
Wiggermann

(10) Patent No.: US 12,370,096 B2  
(45) Date of Patent: Jul. 29, 2025

(54) BRAKING AND STEERING SYSTEM FOR A MOBILE SUPPORT

(71) Applicant: Hill-Rom Services, Inc., Batesville, IN (US)

(72) Inventor: Neal Wiggermann, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 1292 days.

(21) Appl. No.: 16/186,782

(22) Filed: Nov. 12, 2018

(65) Prior Publication Data

US 2020/0138649 A1    May 7, 2020

Related U.S. Application Data

(60) Provisional application No. 62/756,878, filed on Nov. 7, 2018.

(51) Int. Cl.
| | |
|---|---|
| *A61G 1/02* | (2006.01) |
| *A61G 7/018* | (2006.01) |
| *B62B 5/00* | (2006.01) |
| *B62D 51/04* | (2006.01) |
| *G05D 13/00* | (2006.01) |
| *G05D 13/62* | (2006.01) |

(52) U.S. Cl.
CPC ......... *A61G 1/0281* (2013.01); *A61G 1/0287* (2013.01); *B62B 5/0026* (2013.01); *B62D 51/04* (2013.01); *G05D 13/00* (2013.01); *G05D 13/62* (2013.01); *A61G 1/0212* (2013.01); *A61G 1/0275* (2013.01); *A61G 7/018* (2013.01)

(58) Field of Classification Search
CPC .. A61G 1/0281; A61G 1/0287; A61G 1/0212; B62B 5/0404; B62B 5/0438; B62D 51/04
See application file for complete search history.

(56) References Cited

U.S. PATENT DOCUMENTS

| | | | |
|---|---|---|---|
| 5,987,671 | A | 11/1999 | Heimbrock et al. |
| 6,286,165 | B1 | 9/2001 | Heimbrock et al. |
| 6,296,261 | B1 | 10/2001 | deGoma |

(Continued)

FOREIGN PATENT DOCUMENTS

| | | | |
|---|---|---|---|
| CN | 107233168 A | | 10/2017 |
| JP | 11171038 A | * | 6/1999 |

(Continued)

OTHER PUBLICATIONS

JP-11171038-A English Translation (Year: 1999).*

(Continued)

*Primary Examiner* — Justin C Mikowski  
*Assistant Examiner* — Amanda L Bailey  
(74) *Attorney, Agent, or Firm* — Price Heneveld LLP

(57) ABSTRACT

A mobile support such as a stretcher includes a left rear rolling element and a right rear rolling element. The support also includes a sensor system adapted to sense displacement force applied to the support, and a deceleration system. Provided the bed is moving in a forward direction, machine readable instructions executed by a processor cause the deceleration system to apply a decelerating influence to selected members of the set of rolling elements in response to the sensed displacement force in order to assist braking and steering maneuvers.

16 Claims, 17 Drawing Sheets

(56) References Cited

U.S. PATENT DOCUMENTS

| | | |
|---|---|---|
| 6,330,926 B1 | 12/2001 | Heimbrock et al. |
| 6,505,359 B2 | 1/2003 | Heimbrock et al. |
| 6,588,523 B2 | 7/2003 | Jeimbrock et al. |
| 6,749,034 B2 | 6/2004 | Vogel et al. |
| 6,877,572 B2 | 4/2005 | Vogel et al. |
| 6,897,780 B2 | 5/2005 | Ulrich et al. |
| 6,902,019 B2 | 6/2005 | Heimbrock et al. |
| 7,011,172 B2 | 3/2006 | Heimbrock et al. |
| 7,014,000 B2 | 3/2006 | Kummer et al. |
| 7,083,012 B2 | 8/2006 | Vogel et al. |
| 7,090,041 B2 | 8/2006 | Vogel et al. |
| 7,195,253 B2 | 3/2007 | Vogel et al. |
| 7,273,115 B2 | 9/2007 | Kummer et al. |
| 7,302,717 B2 | 12/2007 | Reinke et al. |
| 7,407,024 B2 | 8/2008 | Vogel et al. |
| 7,530,412 B2 | 5/2009 | Heimbrock et al. |
| 7,637,464 B2 | 12/2009 | Heimbrock et al. |
| 7,805,784 B2 | 10/2010 | Lemire et al. |
| 7,828,092 B2 | 11/2010 | Vogel et al. |
| 7,882,582 B2 | 2/2011 | Kappeler et al. |
| 7,886,377 B2 | 2/2011 | Hamberg et al. |
| 7,922,183 B2 | 4/2011 | Figel et al. |
| 8,051,931 B2 | 11/2011 | Vogel et al. |
| 8,240,410 B2 | 8/2012 | Heimbrock et al. |
| 8,267,206 B2 | 9/2012 | Vogel et al. |
| 8,340,869 B2* | 12/2012 | Wakita .................. A61G 5/04 701/99 |
| 8,341,777 B2 | 1/2013 | Hensley et al. |
| 8,397,846 B2 | 3/2013 | Heimbrock et al. |
| 8,442,738 B2 | 5/2013 | Patmore |
| 8,756,726 B2 | 6/2014 | Hamberg et al. |
| 9,125,779 B2 | 9/2015 | Hyde et al. |
| 9,615,983 B2* | 4/2017 | Stryker .................. A01N 59/20 |
| 9,707,143 B2 | 7/2017 | Thodupunuri et al. |
| 10,004,651 B2 | 6/2018 | DeLuca et al. |
| 11,249,476 B2* | 2/2022 | Kuwabara ............ G05D 1/0061 |
| 2006/0059623 A1* | 3/2006 | Karmer .................. A61G 7/018 5/616 |
| 2010/0023236 A1* | 1/2010 | Morgan ................ B60W 30/14 701/71 |
| 2010/0164334 A1* | 7/2010 | Schiller ...................... B62J 6/08 307/31 |
| 2011/0087416 A1* | 4/2011 | Patmore ............... A61G 1/0287 180/19.1 |
| 2014/0076644 A1 | 3/2014 | Derenne et al. |
| 2015/0066275 A1* | 3/2015 | Masaki ................ B62B 5/0073 180/19.1 |
| 2015/0075575 A1* | 3/2015 | Karlovich ................ A47C 1/00 135/65 |
| 2016/0120740 A1* | 5/2016 | Rawls-Meehan .... A47C 31/008 601/49 |
| 2016/0193095 A1 | 7/2016 | Roussy et al. |
| 2017/0020752 A1* | 1/2017 | Childs ...................... B60T 7/22 |
| 2017/0119607 A1 | 5/2017 | Derenne et al. |
| 2018/0250178 A1 | 9/2018 | Paul et al. |
| 2019/0125602 A1* | 5/2019 | Patmore ................ A61G 7/018 |

FOREIGN PATENT DOCUMENTS

| | | | |
|---|---|---|---|
| JP | 2006069446 A | * | 3/2006 |
| WO | 1994001292 A1 | | 1/1994 |
| WO | 2011046917 A2 | | 4/2011 |

OTHER PUBLICATIONS

JP-2006069446-A English Translation (Year: 2006).*
Applied Ergonomics 58 (2017) 59-65; Effect of a powered drive on pushing and pulling forces when transporting bariatric hospital beds; Neal Wiggermann; Hill-Rom, Batesville, IN USA.

* cited by examiner

BRAKING AND STEERING SYSTEM FOR A MOBILE SUPPORT

TECHNICAL FIELD

The subject matter described herein relates to a braking and steering system for a mobile support. One application for the disclosed braking and steering system is a stretcher or other occupant support of the type used in health care settings.

BACKGROUND

Although much attention is paid to the forces required to push a mobile device such as a hospital bed or stretcher, the greatest forces exerted on a caregiver or other user when transporting a patient are often associated with maneuvering (e.g. steering around corners) or braking (Wiggermann, "Effect of a Powered Drive on Pushing and Pulling Forces When Transporting Bariatric Hospital Beds", Applied Ergonomics 58 (2017) pp 59-65, 2017). Additionally, being able to more quickly brake when stopping the bed or stretcher or when descending a ramp can improve safety for the patient, the caregiver and others in the vicinity.

It is therefore desirable to develop stretchers, beds and associated methods that facilitate a user's ability to safely carry out steering and braking maneuvers. Although the subject matter described herein may be beneficial for stretchers and beds not equipped with a propulsion unit, it may also find applicability on beds so equipped.

SUMMARY

A mobile support includes at least a left rear rolling element and a right rear rolling element. The support also includes a sensor system adapted to sense displacement force applied to the support, and a deceleration system. Provided the bed is moving in a forward direction, machine readable instructions executed by a processor cause the deceleration system to apply a decelerating influence to selected members of the set of rolling elements in response to the sensed displacement force.

BRIEF DESCRIPTION OF THE DRAWINGS

The features of the various embodiments of the mobile support described herein will become more apparent from the following detailed description and the accompanying drawings in which.

DETAILED DESCRIPTION

Figure 1:
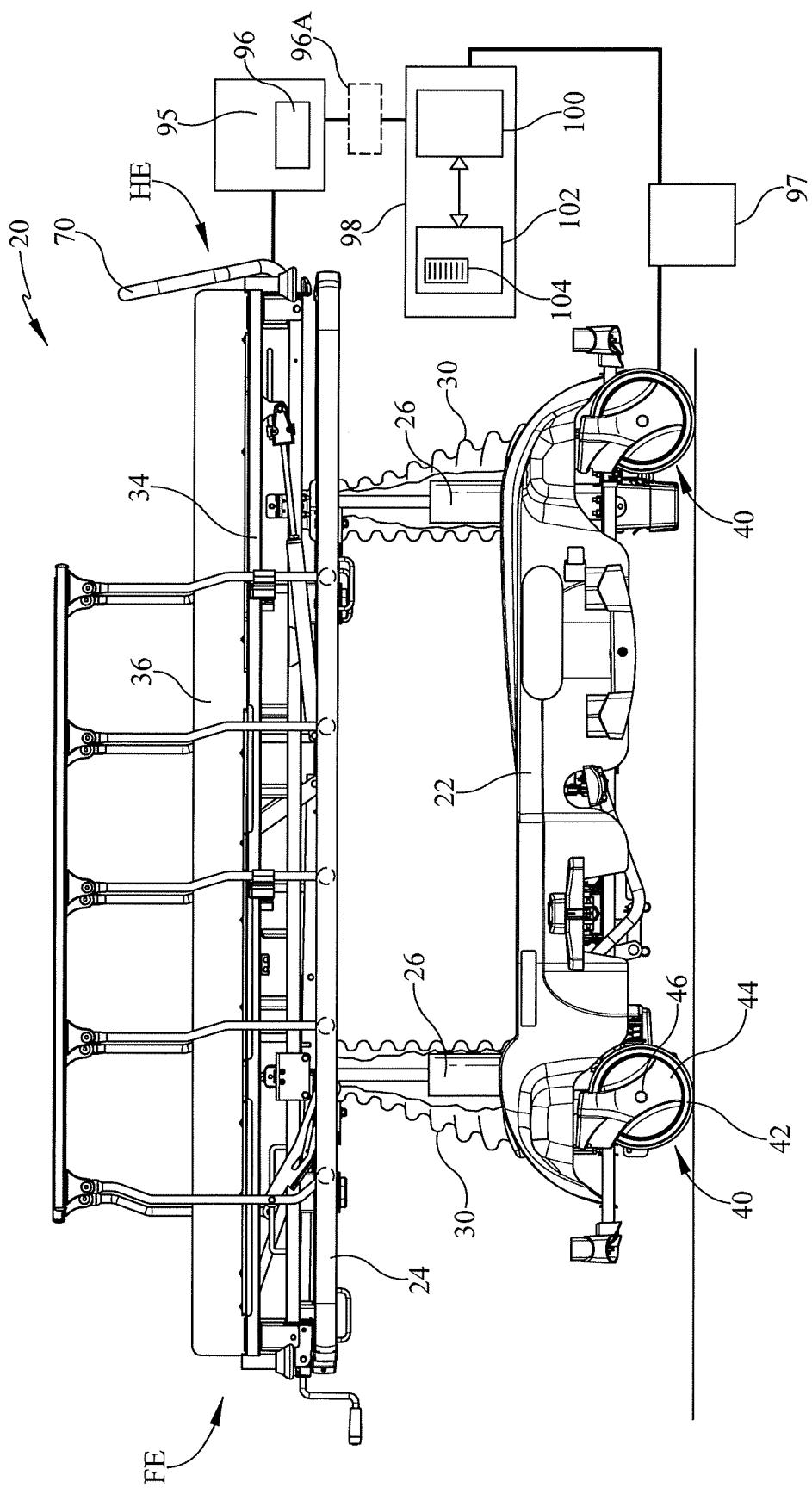
FIG. 1 is a side elevation view of a mobile support, specifically a stretcher, with a set of four rolling elements in the form of casters, a pair of handles at the head end of the stretcher to enable a user to exert a pushing or pulling force on the stretcher, and a schematically illustrated control system which commands the application of a decelerating influence to selected casters to assist braking and steering maneuvers.

The present invention may comprise one or more of the features recited in the appended claims and/or one or more of the following features or combinations thereof.

In this specification and drawings, features similar to or the same as features already described may be identified by reference characters or numerals which are the same as or similar to those previously used. Similar elements may be identified by a common reference character or numeral, with suffixes being used to refer to specific occurrences of the element. Examples given in this application are prophetic examples.

Figure 2:
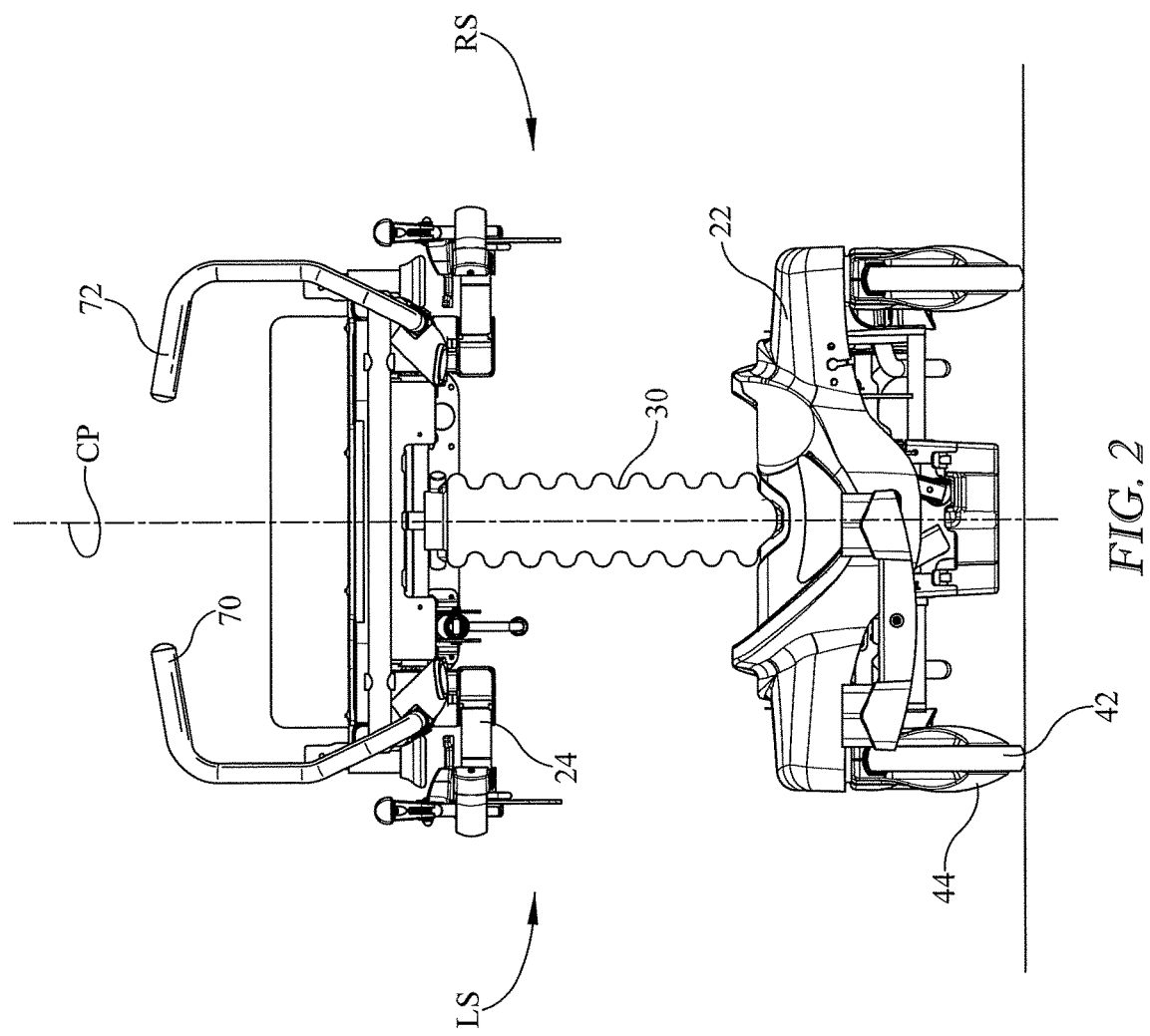
FIG. 2 is a head end elevation view of the stretcher of FIG. 1.

Referring to FIGS. 1 and 2, a stretcher 20 extends longitudinally from a head end HE to a foot end FE and laterally from a first side Si to a second side 52. The drawing also shows a notional centerplane CP.

The stretcher includes a framework comprised of a frame which includes at least a base frame 22 which is not elevation adjustable. The frame of the illustrated stretcher also includes an elevatable frame 24 supported on the base frame by head end and foot end hydraulic cylinders 26, each of which is housed inside a flexible boot 30. The hydraulic cylinders enable vertical adjustment of the elevatable frame relative to the base frame. The frame supports a deck 34. The deck supports a mattress 36.

Figure 3:
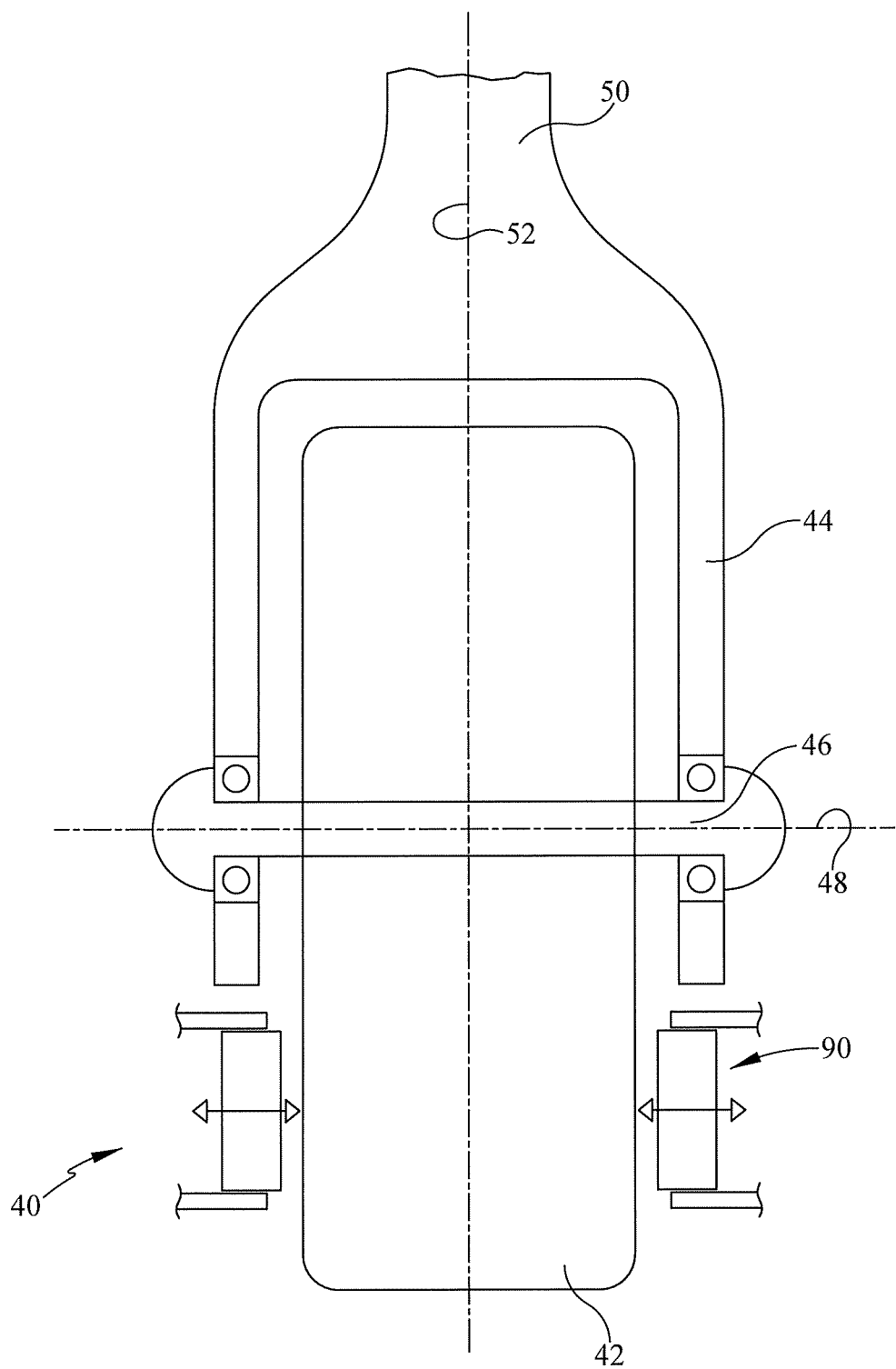
FIG. 3 is a schematic view of a caster and a brake caliper as seen by an observer looking perpendicular to the rotational axis of the caster.

Referring additionally to FIG. 3 the stretcher also includes a set of rolling element assemblies 40. The illustrated rolling element assemblies are casters. Each caster comprises a rolling element such as wheel 42, and a fork 44 which embraces the wheel. An axle 46 extends through the fork and the wheel. Each wheel is rotatable about its own rotational axis 48. A stem portion 50 of each fork is pivotably attached to frame 22 so that the fork, and therefore the wheel connected to it, is pivotable about pivot axis 52.

Referring momentarily to FIGS. 4A-4D, the stretcher includes left front (LF) left rear (LR) right front (RF) and right rear (RR) rolling element assemblies distinguished from each other by their location on the stretcher in relation to a person P positoned at the head end or foot end of the stretcher and facing the stretcher.

The rolling elements are unpowered. Unpowered means that there is no motor or similar device that, in the absence of a force applied by a human user, drives the wheels and urges them to rotate about rotational axis 48 or to pivot about pivot axis 52. Instead, the wheels rotate or pivot in response to a force applied elsewhere on the stretcher. In one example the force is a manual force applied to handles, which are described below. In another example the force is a nonmanual force applied elsewhere on the stretcher. One example of a nonmanual force is the force applied to the stretcher frame by a propulsion unit such as the traction device described in U.S. Pat. No. 7,014,000, the contents of which are incorporated herein by reference. In both the manual and nonmanual examples a force is applied to a stretcher component other than the rolling elements. The rolling elements rotate and pivot about axes 48, 50 in response to the inertia of the stretcher being overcome by the force applied elsewhere.

The stretcher also includes a left handle or handlebar 70 and a right handle or handlebar 72, both of which extend from elevatable frame 24. A caregiver or other user exerts pushing and/or pulling forces on the handles in order to move the stretcher and guide it along either a straight or curved trajectory. A push force is a force exerted by a user which tends to push the stretcher longitudinally away from the user. (In practice the user follows the stretcher.) A pull force is a force exerted by a user which tends to pull the stretcher longitudinally toward the user. (In practice the stretcher follows the user.) Other architectures which enable a user to control translation and steering of the stretcher when transporting it from place to place may also be satisfactory. One example of an alternative architecture is headboard 74 of the bed of FIG. 5 which has openings 76, 78 defining left and right grips 86, 88.

Provisions may also be made for exerting a force at the foot end FE of the stretcher. Still referring to FIG. 5, one example is a footboard 94, similar to headboard 74. The footboard includes openings 76F, 78F and grips 86F, 88F similar to those of headboard 74. Another example is handles such as handles 70, 72 of FIG. 2 but located instead at foot end FE.

When the stretcher is being pushed or pulled from its foot end, the designations "front" and "rear" are reversed in comparison to when the stretcher is being pushed or pulled from its head end. Specifically the rear rolling elements are re-designated as front rolling elements, and the front rolling elements are redesignated as rear rolling elements. In addition, left and right are reversed. These redesignations and reversals are illustrated in FIGS. 4A-4D.

Figure 4A:
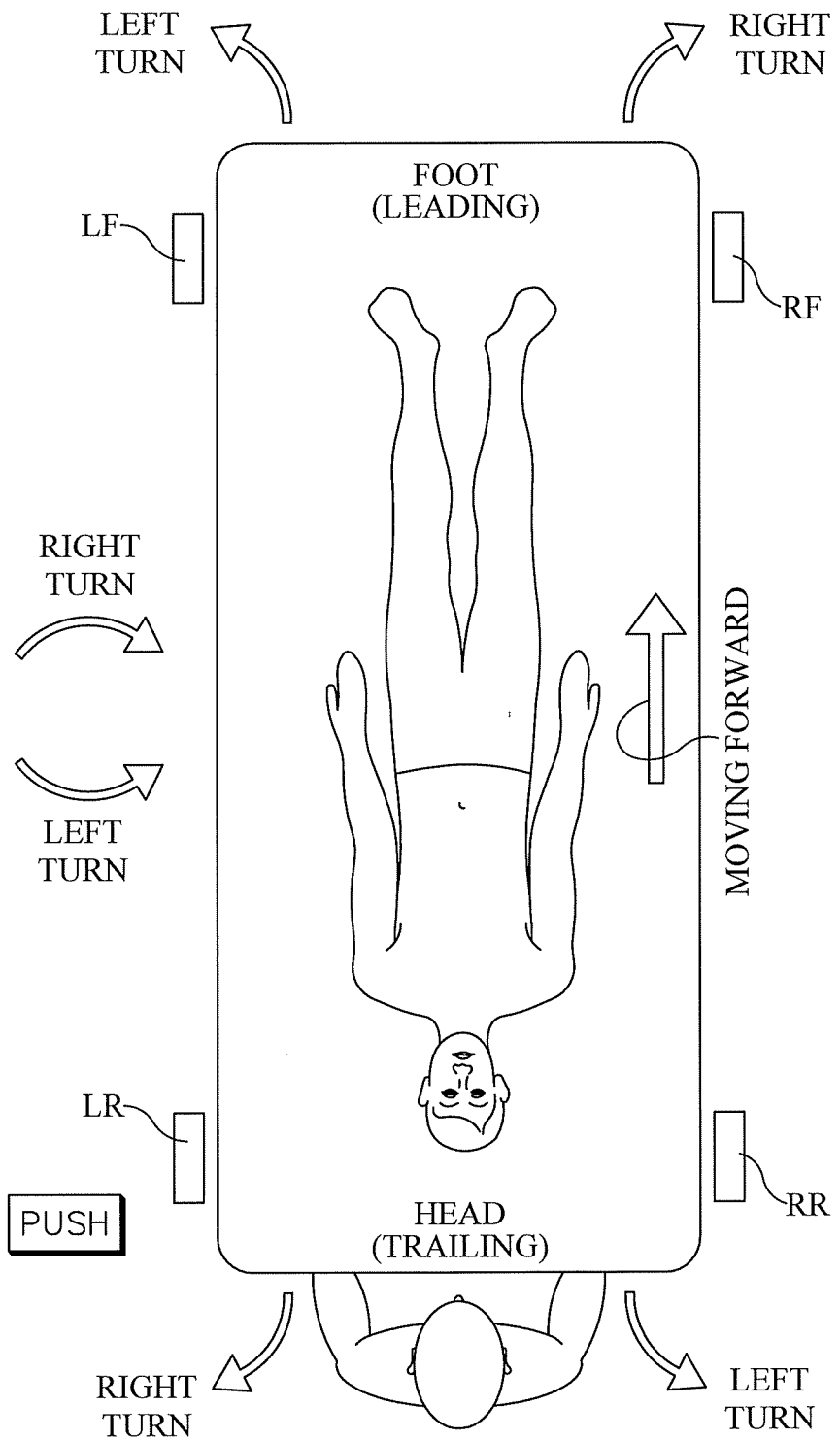
FIGS. 4A-4D are schematic plan views identifying four rolling elements of the stretcher by their location on the stretcher—left front (LF), left rear (LR) right front (RF) and right rear (RR) and also identifying forward and rearward directions and left and right turn directions for all four combinations of a user pushing and pulling a stretcher from its head end and foot end.
Figure 4B:
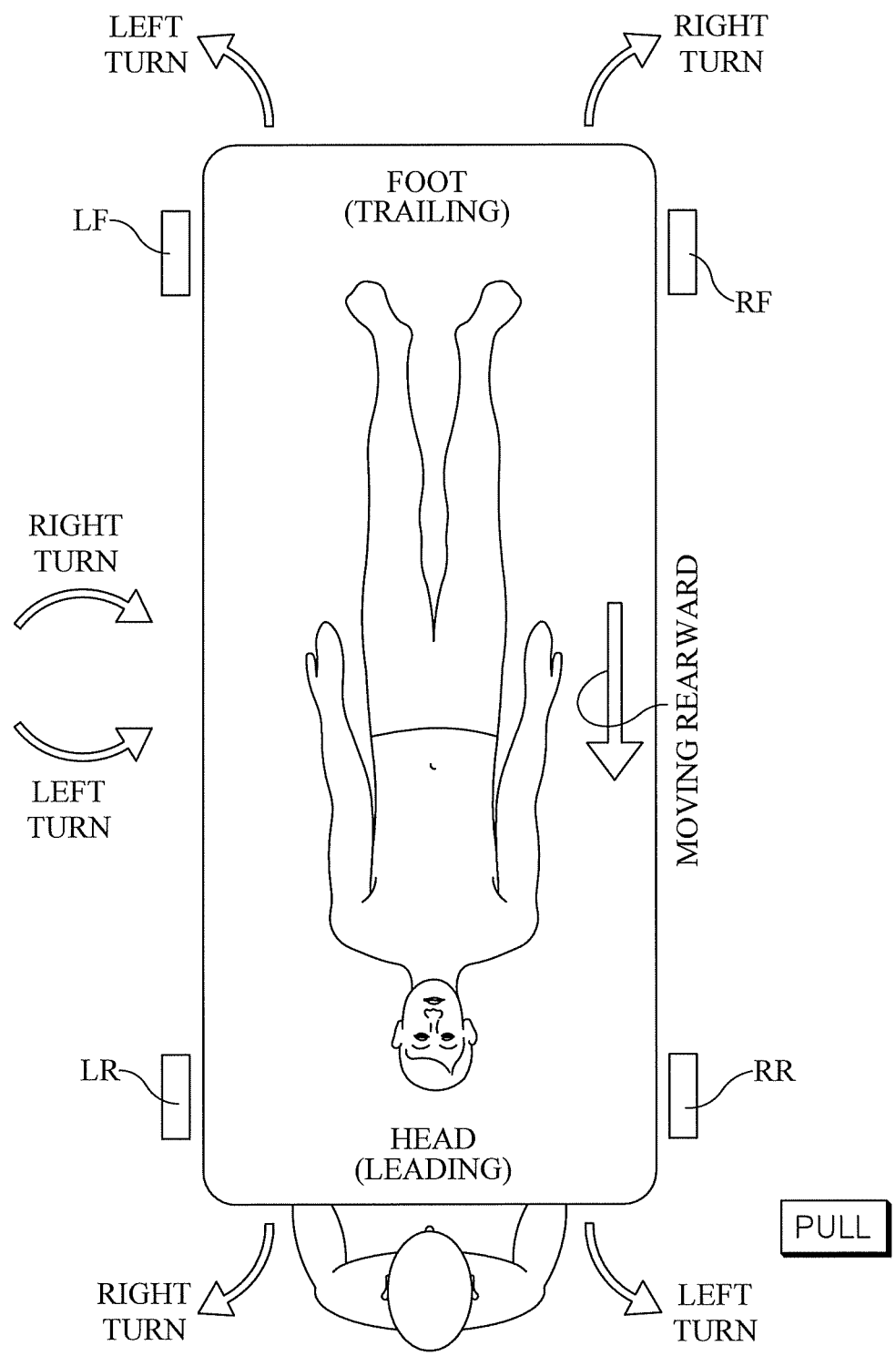
Figure 4C:
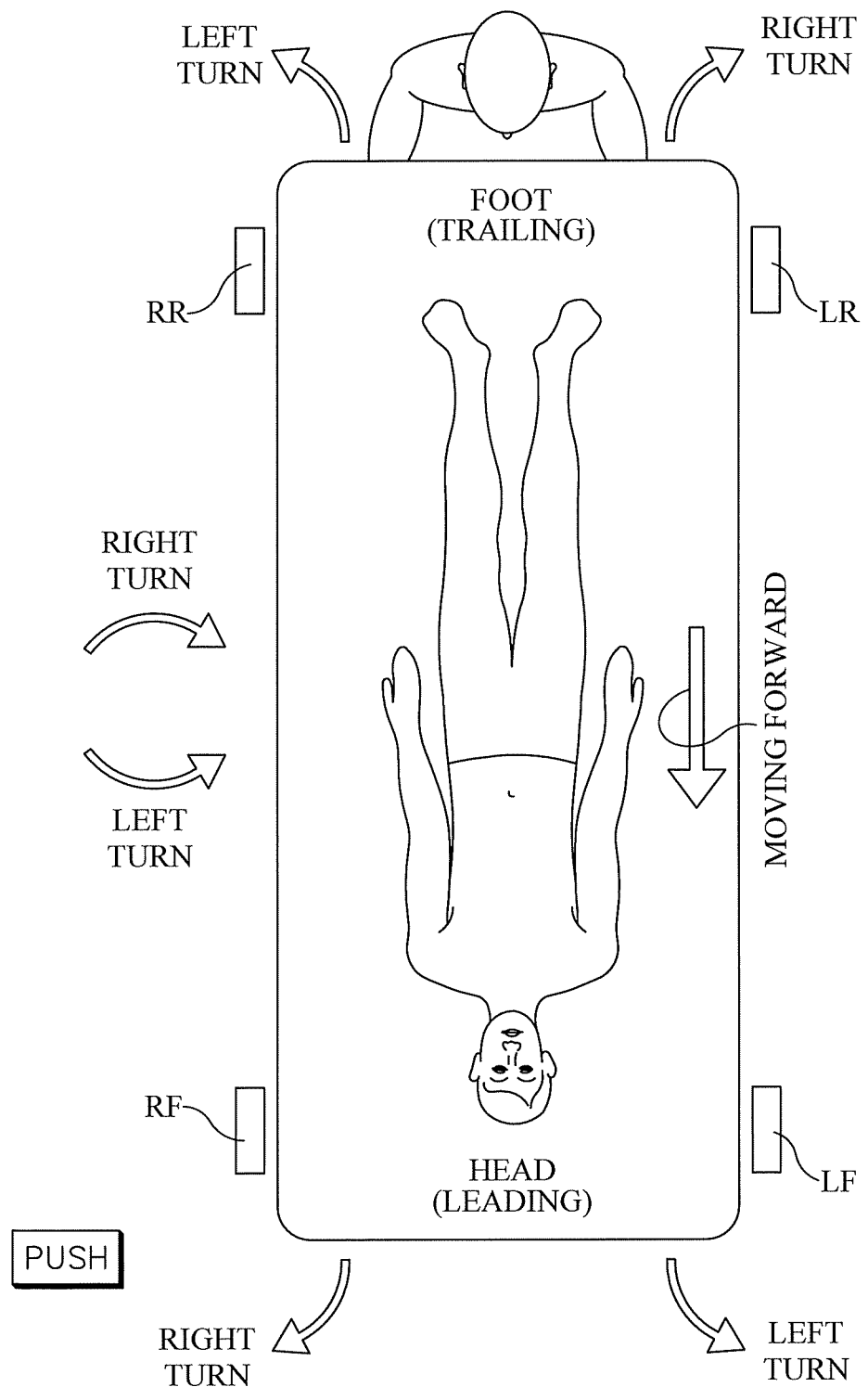
Figure 4D:
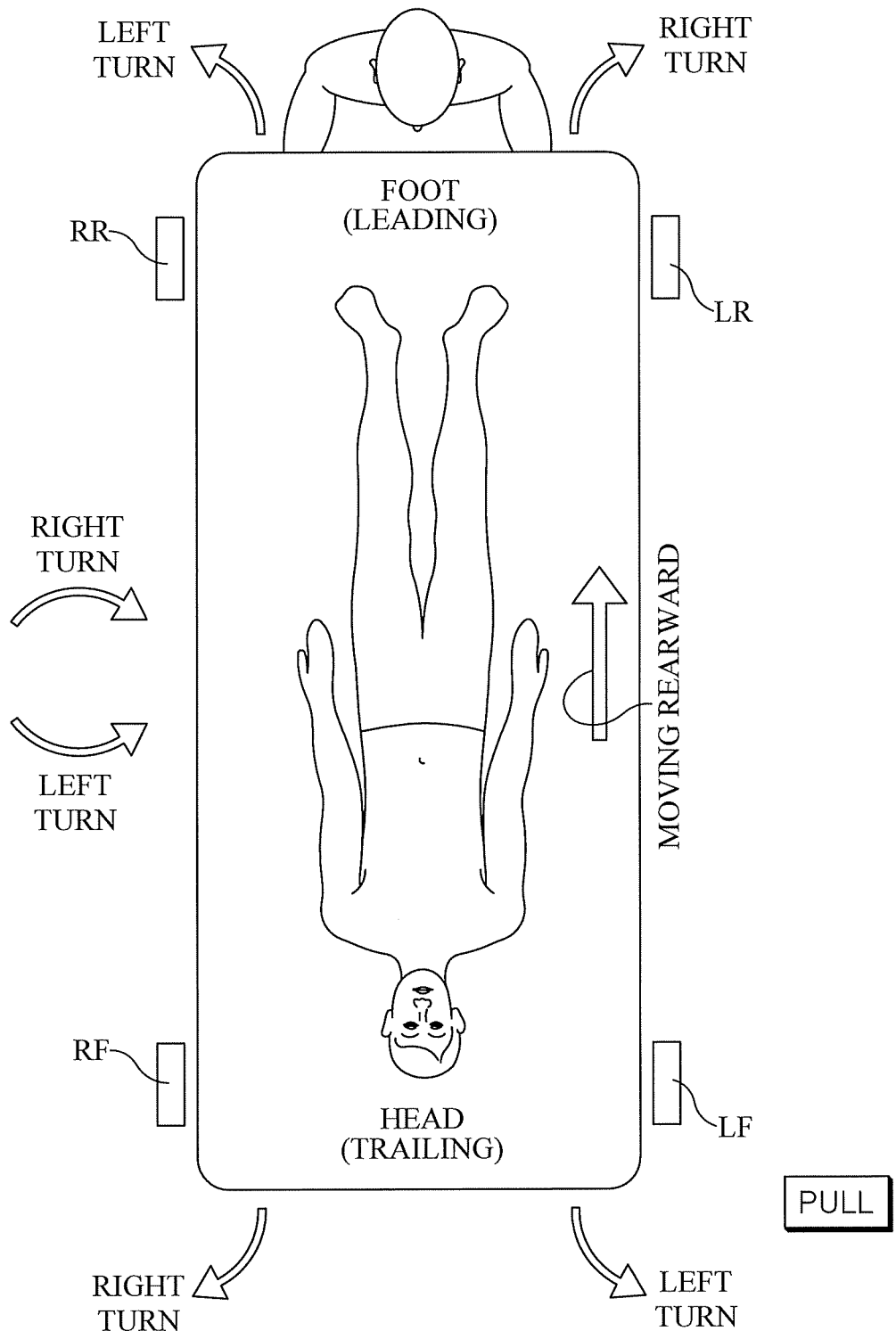

Referring to FIGS. 4A-4D, the rolling elements closer to the person P moving the stretcher are considered to be the rear rolling elements. The rolling elements further away from the person moving the stretcher are considered to be the front rolling elements. When the person is acting from the foot end of the stretcher the left side rolling elements are redesignated as right side rolling elements, and vice versa, in comparison to when the person is acting at the head end of the stretcher (FIG. 4C vs FIG. 4A and FIG. 4D vs. FIG. 4B). When the person is pushing the stretcher, the stretcher is considered to be moving forwardly (FIGS. 4A, 4C). When the person is pulling the stretcher, the stretcher is considered to be moving rearwardly (FIGS. 4B, 4D). The illustration also shows that when the stretcher is being pushed (FIGS. 4A and 4C), the front rolling elements are "leading" rolling elements and the rear rolling elements are "trailing" rolling elements and that the reverse is true when the stretcher is being pulled (FIGS. 4B and 4D). The illustration also shows that a right turn corresponds to a clockwise rotation of the stretcher as seen from above, and a left turn corresponds to a counterclockwise rotation of the stretcher as seen from above.

Figure 5:
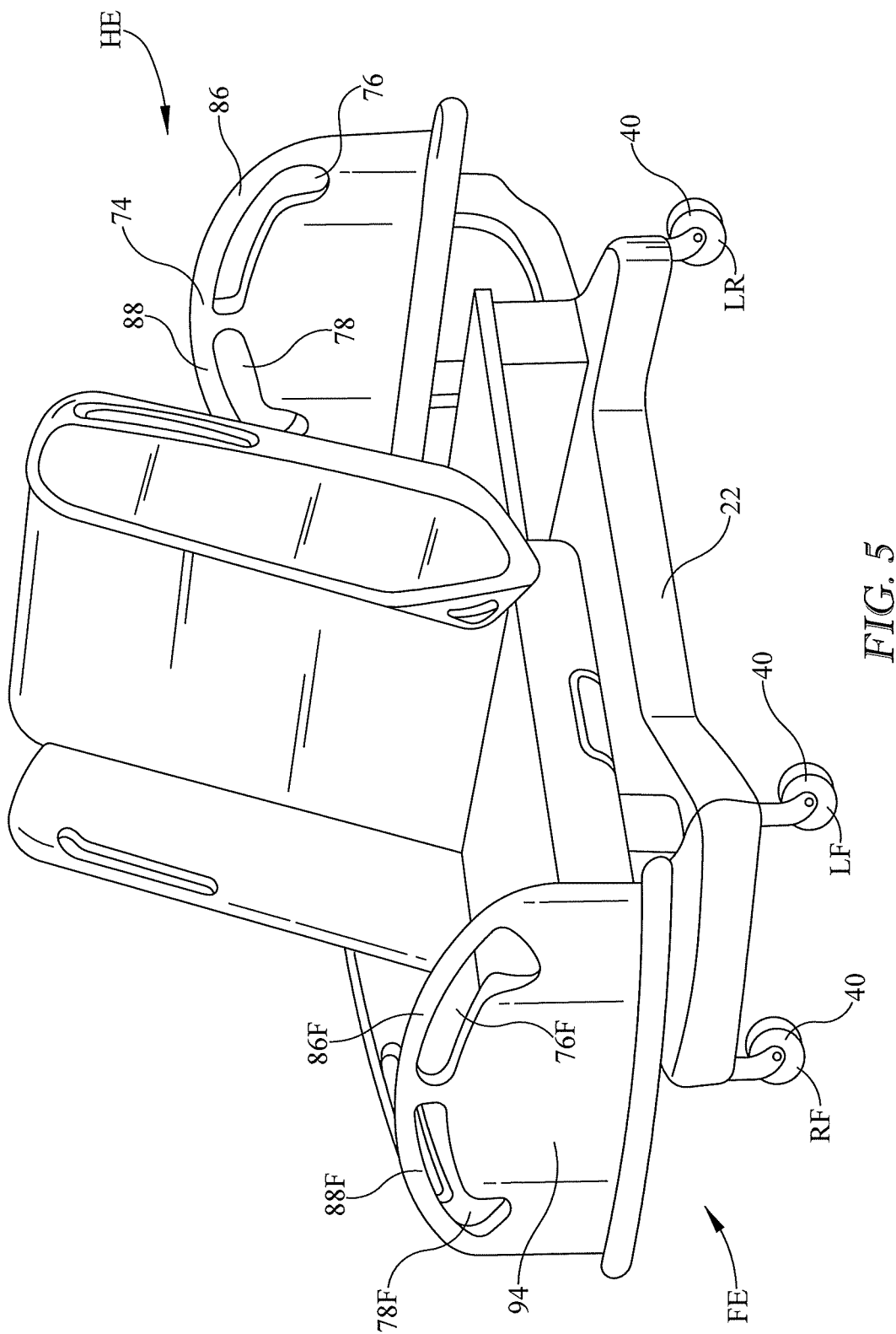
FIG. 5 is a view of a mobile support, specifically a bed, showing a headboard and a footboard which enable a user to exert a pushing or pulling force on the head end or the foot end of the stretcher.

A force exerted by a user in order to push, pull or steer the stretcher is referred to herein as a displacement force. Given that the intent is to push, pull or steer the stretcher, such forces have a mostly horizontal component where horizontal means parallel to the surface along which the stretcher is moving or is intended to move. Thus, the horizontal plane for a stretcher on a ramp is parallel to the ramp, not parallel to the geographic horizon. In the embodiment of FIGS. 1-2 the sensed displacement force depends on user force exerted on one or both handles 70, 72. In the embodiment of FIG. 5 the sensed displacement force depends on user force exerted on one or both grips 86, 88 (or 86F, 88F). In general, the sensed displacement force depends on user force exerted on whatever component of the stretcher is employed by a user to exert displacement forces thereon.

Irrespective of the architecture used to enable pushing, pulling and steering of the stretcher, the strecher also includes a sensor system 95 adapted to sense and process the applied displacement forces. Such a system is described in U.S. Pat. No. 7,014,000. Signal processing is carried out by a signal processing module which may be considered to be part of the sensor system as indicated by reference numeral 96, or may be considered to be a separate module as indicated in phantom by reference numeral 96A. The tasks of the signal processing module include ensuring that the control system is not confused by noisy signals. The signal should be "clean" enough to allow the decision making rules of instructions 104 (described further below) to operate according to design intent. Sources of signal noise include fluctuations in the forces that a user exerts on the left and right handles due to the user's gait.

Figure 12:
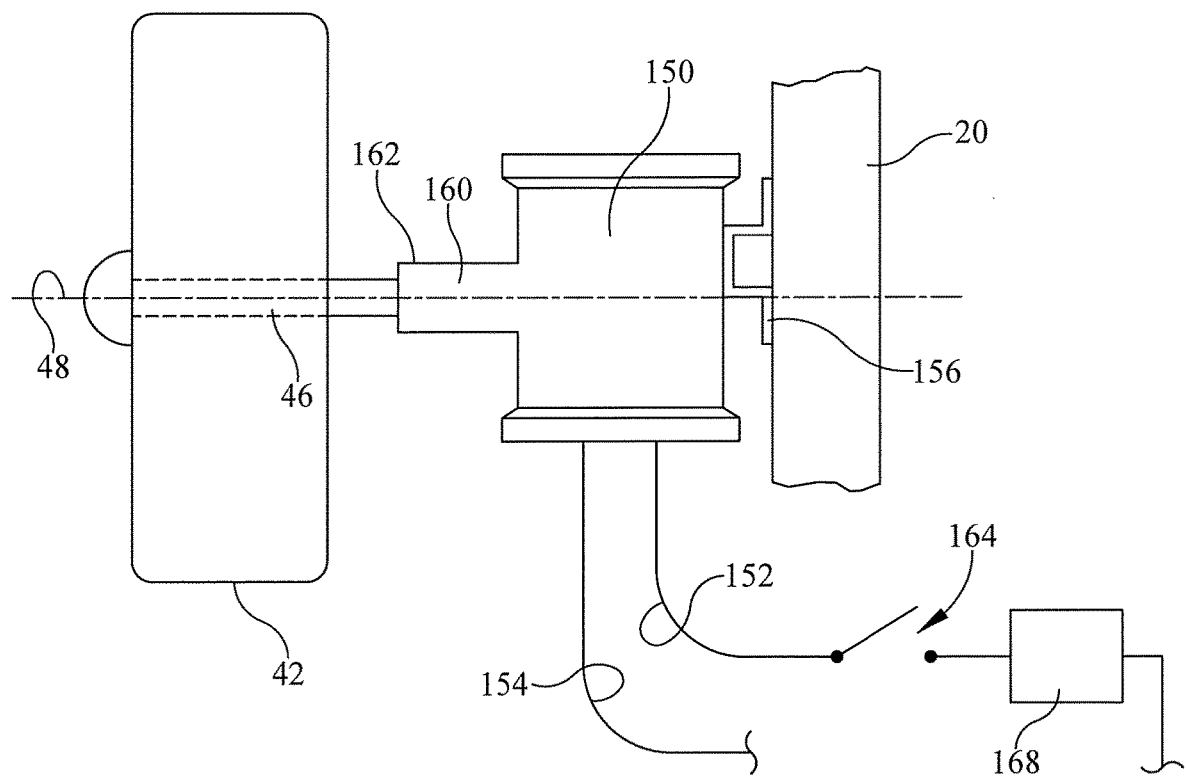
FIG. 12 is a schematic view of a portion of a stretcher showing an electric generator splined to an axle of a caster wheel, and a load connectable to the generator by a switch so that when the switch is closed the generator acts as a nonmechanical brake.

The stretcher also includes a deceleration system 97 arranged to apply a decelerating influence to a subset of the rolling elements. The subset of the set of rolling elements upon which the deceleration system acts may be a proper subset (fewer than all the elements of the set of rolling elements) or an improper subset (all the elements of the set of rolling elements). In one embodiment the decelerating influence is provided by a deceleration system comprised of a mechanical brake such as the braking caliper 90 of FIG. 3. As used herein, a mechanical brake is a brake having a component that contacts the rolling element so that friction causes the rolling element to decelerate. Mechanical brakes include brakes having electrical or electromechanical components. Other braking arrangements which do not rely on friction between components of the brake, for example systems that rely on electromagnetic fields, may also be used. Such a system is shown in FIG. 12, and is described in more detail below.

The stretcher also includes a control system 98 comprised of a processor 100 and a memory 102 containing machine readable instructions 104. As described in more detail below, the machine readable instructions, when executed by the processor, cause the deceleration system to apply a decelerating influence to a subset of (i.e. to selected members of) the set of rolling elements. Alternatively, one can think of the processor, acting in accordance with the instructions, as the component which causes the deceleration system to apply the decelerating influence to selected members of the set of rolling elements. The two points of view are considered equivalent and interchangable in this application.

The depiction of FIG. 1 suggests that processor 100 and memory 104 are physically on board the stretcher. However the processor, the memory, or both may be physically located off board the stretcher, in which case an appropriate communication network is provided to enable communication between the memory and the processor, and to enable the deceleration system to receive a command from control system 95 to apply a decelerating influence to selected rolling elements.

Figure 6:
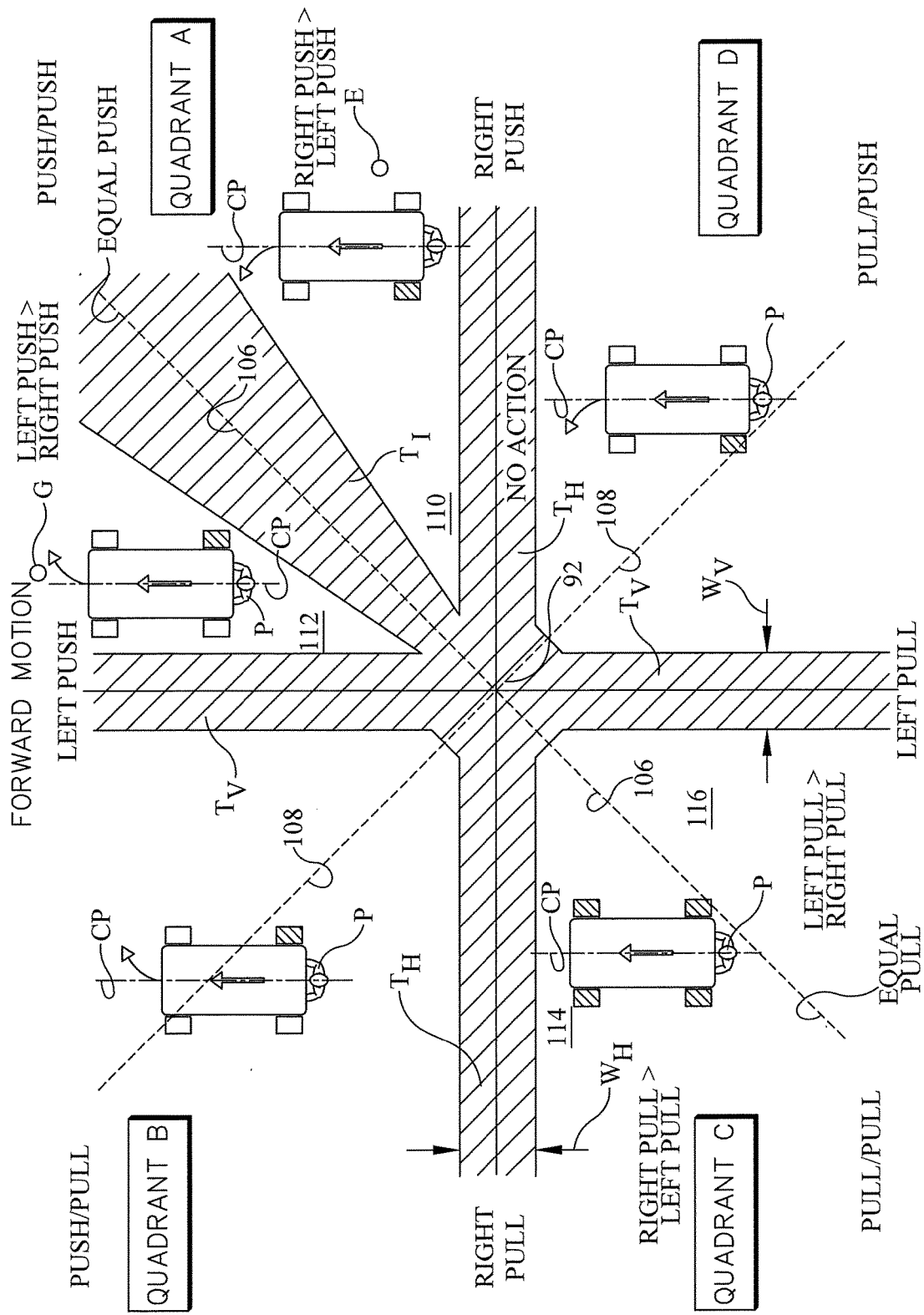
FIG. 6 is a diagram explaining operation of a braking and steering system for a mobile device, such as a stretcher, when the stretcher is moving in a forward direction.

FIG. 6 is a diagram showing details of the relationship between the displacement force applied to the stretcher and the decelerating influence to be applied to selected rolling elements 42. FIG. 6 shows the relationship when the stretcher is moving in the forward direction (FIGS. 4A and 4C). Unless specified otherwise, the examples of FIG. 6, and elsewhere in this specification assume that the center of gravity of the stretcher and its occupant resides on centerplane CP and that the displacement forces applied to the strecher by the user are exerted laterally equidistantly from centerplane CP.

The diagram of FIG. 6 includes a horizontal axis and a vertical axis which intersect each other at an origin 92 and divide the diagram into quadrants A, B, C and D. The horizontal axis is a "Right" axis corresponding to the magnitudes of displacement forces exerted to the right of stretcher centerplane CP. The vertical axis is a "Left" axis corresponding to the magnitudes of displacement forces exerted to the left of stretcher centerplane CP. Origin 92 corresponds to zero force.

Quadrant A represents a push force being applied to the stretcher on both the left and right sides of the centerplane. Quadrant C represents a pull force being applied to the stretcher on both the left and right sides of the centerplane. Quadrant B represents a push force being applied to the stretcher on the left side of the centerplane and a pull force being applied to the stretcher on the right side of the centerplane. Quadrant D represents a push force being applied to the stretcher on the right side of the centerplane and a pull force being applied to the stretcher on the left side of the centerplane. In summary, the quadrants are:

A: left push/right push,
B: left push/right pull,
C: left pull/right pull,
D: left pull/right push.

A 45 degree positively sloped diagonal 106 extends through quadrants A and C. A 45 degree negatively sloped diagonal 108 extends through quadrants B and D. The diagonals are lines of equal force magnitude. Diagonal 106 divides quadrant A into a sector 110 in which the right push force exceeds the left push force and a sector 112 in which the left push force exceeds the right push force. Diagonal 106 also divides quadrant C into a sector 114 in which the right pull force exceeds the left pull force and a sector 116 in which the left pull force exceeds the right pull force.

The diagram also includes a force tolerance band $T_H$ associated with the horizontal axis and a force tolerance band $T_V$ associated with the vertical axis. Displacement forces within the force tolerance bands are forces which are considered too small to be interpreted as indicating a user's intent. Forces within the bands are considered to be "nonactionable" in that they do not provoke any action on the part of control system 98 in connection with commanding the deceleration system to steer or brake the mobile support.

The force tolerance bands may be established by the system designer based on testing and usability studies. The horizontal and vertical tolerance bands have a constant width $W_H$, $W_V$, except that they flare out near origin 92. Non-constant force tolerance bands and flare geometries other than the illustrated straight line flare geometry may also be satisfactory. In quadrant A the horizontal and vertical force tolerance bands blend into an inequality tolerance band $T_I$, further description of which is provided later in this specification.

Each quadrant of the diagram also includes a schematic plan view depicting a stretcher having four rolling elements as already described.

In operation, machine readable instructions 104, when executed by processor 100, cause the deceleration system to apply the decelerating influence to selected members of the set of rolling elements in response to the sensed displacement force as set forth in Table 1 below. In the tables in this specification, including the claims, certain rows of the table do not have an entry in the "Force Relationship" column. The absence of an entry means that the decelerating influence to be applied does not depend on the relative magnitudes of the left and right forces.

TABLE 1

| Displacement Force Combination | | Quadrant or Sector | Force Relationship | Application of Decelerating Influence (Stretcher Moving Forwardly) |
|---|---|---|---|---|
| Left | Right | | | |
| Push | Push | 110 | Right push > Left Push | Dominant on Left Side |
| Push | Push | 112 | Left push > Right Push | Dominant on Right Side |
| Push | Pull | B | | Dominant on Right Side |
| Pull | Pull | C | | Substantially Equal on Left and Right |
| Pull | Push | D | | Dominant on Left Side |

For example, in sector 110 the right push force exceeds the left push force. Recalling that the diagram of FIG. 6 is for the case of a stretcher moving in the forward direction, the lateral force imbalance is taken as an indication that the user wishes to steer the stretcher to the left. Therefore, instructions 104, when executed by processor 100, cause the deceleration system to apply a decelerating influence which is left side dominant, i.e. dominant on the left side of the stretcher. One way to achieve a left dominant decelerating influence is to operate the brake for one of the left side rolling elements, LF, LR. In the schematic example of sector 110 the left side dominance is achieved by applying the decelerating influence to the left rear rolling element as indicated by the shading applied to that element.

In sector 112 the left push force exceeds the right push force. Recalling that the diagram of FIG. 6 is for the case of a stretcher moving in the forward direction, the lateral force imbalance is taken as an indication that the user wishes to steer the stretcher to the right. Therefore, instructions 104, when executed by processor 100, cause the deceleration system to apply a decelerating influence which is right side dominant, i.e. dominant on the right side of the stretcher. One way to achieve a right dominant decelerating influence is to operate the brake for one of the right side rolling elements, RF, RR. In the schematic example of sector 112 the right side dominance is achieved by applying the decelerating influence to the right rear rolling element as indicated by the shading applied to that element.

Figure 7:
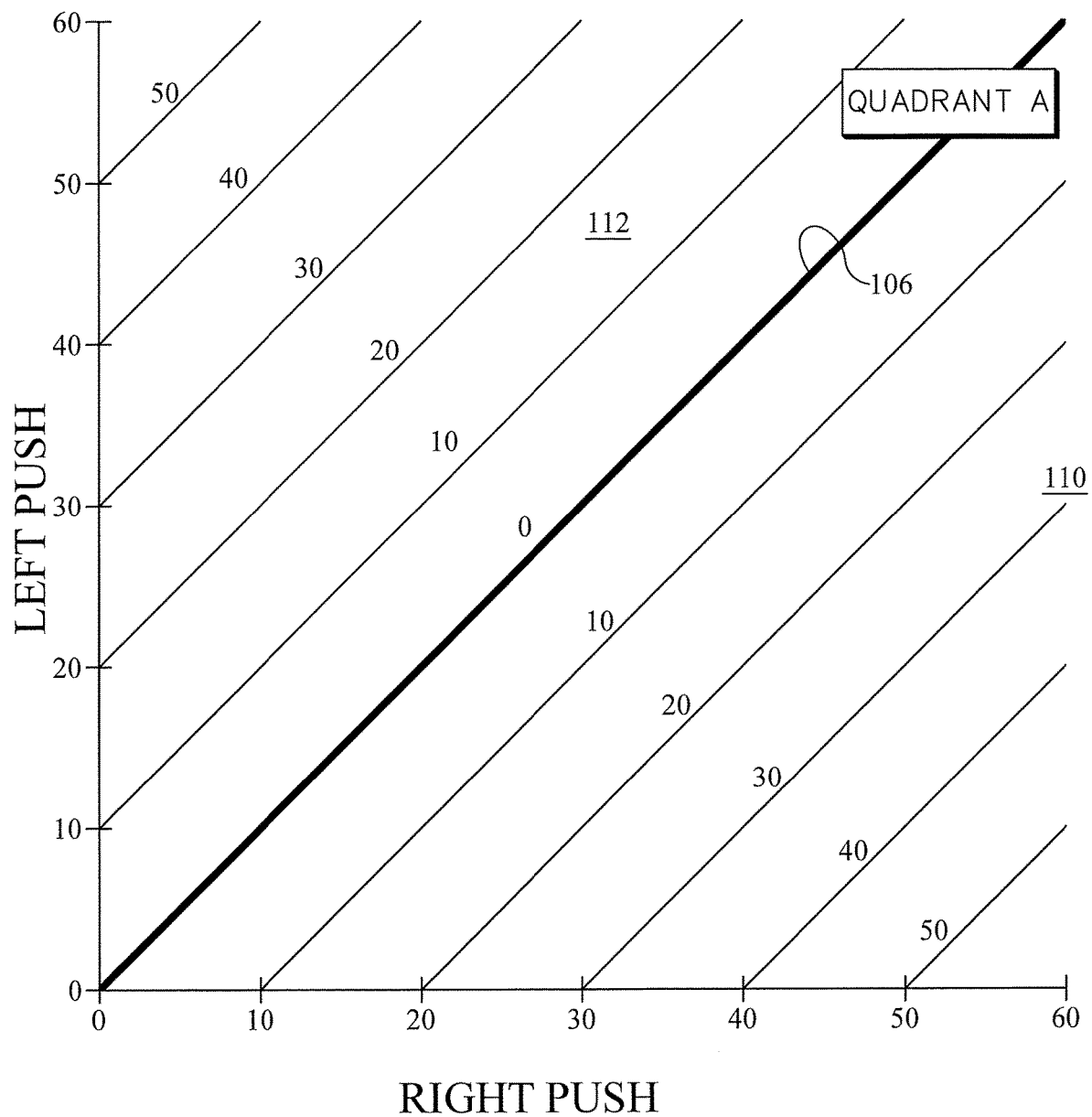
FIGS. 7, 8 and 9 are quadrants A, B and D respectively of FIG. 6 showing lines of constant differential force applied by the user to, for example, left and right handles of the stretcher.

The strength of the applied braking influence depends on the relative magnitudes of the left push force and the right push force. FIG. 7 is quadrant A of FIG. 6 showing lines of constant turning moment applied to the handles as the result of a user exerting left and right pushing forces on the left and right handles respectively. The values shown in FIG. 7 are provided to make the example more concrete, but are not necessarily representative of the forces and moments that would be encountered in practice. As already noted, diagonal 106 is a line of equal left and right force which divides left turn sector 110 from right turn sector 112. Turning moments below diagonal 106 cause control system 98 to command a decelerating influence which is left side dominant in order to facilitate a left turn. Turning moments above diagonal 106 cause control system 98 to command a decelerating influence which is right side dominant in order to facilitate a right turn.

Larger turning moments, either above or below diagonal 106, cause control system 98 to command sharper, smaller radius turns, for example by commanding brake calipers 90 to squeeze tightly against the sidewalls of left rear wheel LR (to facilitate a left turn) or to squeeze tightly against the sidewalls of right rear wheel RR (to facilitate a right turn). By contrast, smaller turning moments cause control system 98 to command gentler, larger radius turns, for example by commanding brake calipers 90 to squeeze less tightly against the sidewalls of left rear or right rear wheel. In general, larger differences between the magnitudes of the left and right push forces (i.e. further from diagonal 106) indicate a desire for a more abrupt turn and smaller differences in force magnitude (closer to diagonal 106) indicate a desire for a less abrupt turn.

In quadrant B of FIG. 6 the stretcher is subject to a combination of push displacement force and pull displacement force, specifically a right pull and a left push. Recalling that the diagram of FIG. 6 is for the case of a stretcher moving in the forward direction, the combination of the left push force and the right pull forces is taken as an indication that the user wishes to steer the stretcher to the right. Therefore, instructions 104, when executed by processor 100, cause the deceleration system to apply a decelerating influence which is right side dominant, i.e. dominant on the right side of the stretcher. One way to achieve a right dominant decelerating influence is to operate the brake for one of the right side rolling elements, RF, RR. In the schematic example of quadrant B the right side dominance is achieved by applying the decelerating influence to the right rear rolling element as indicated by the shading applied to that element.

Figure 8:
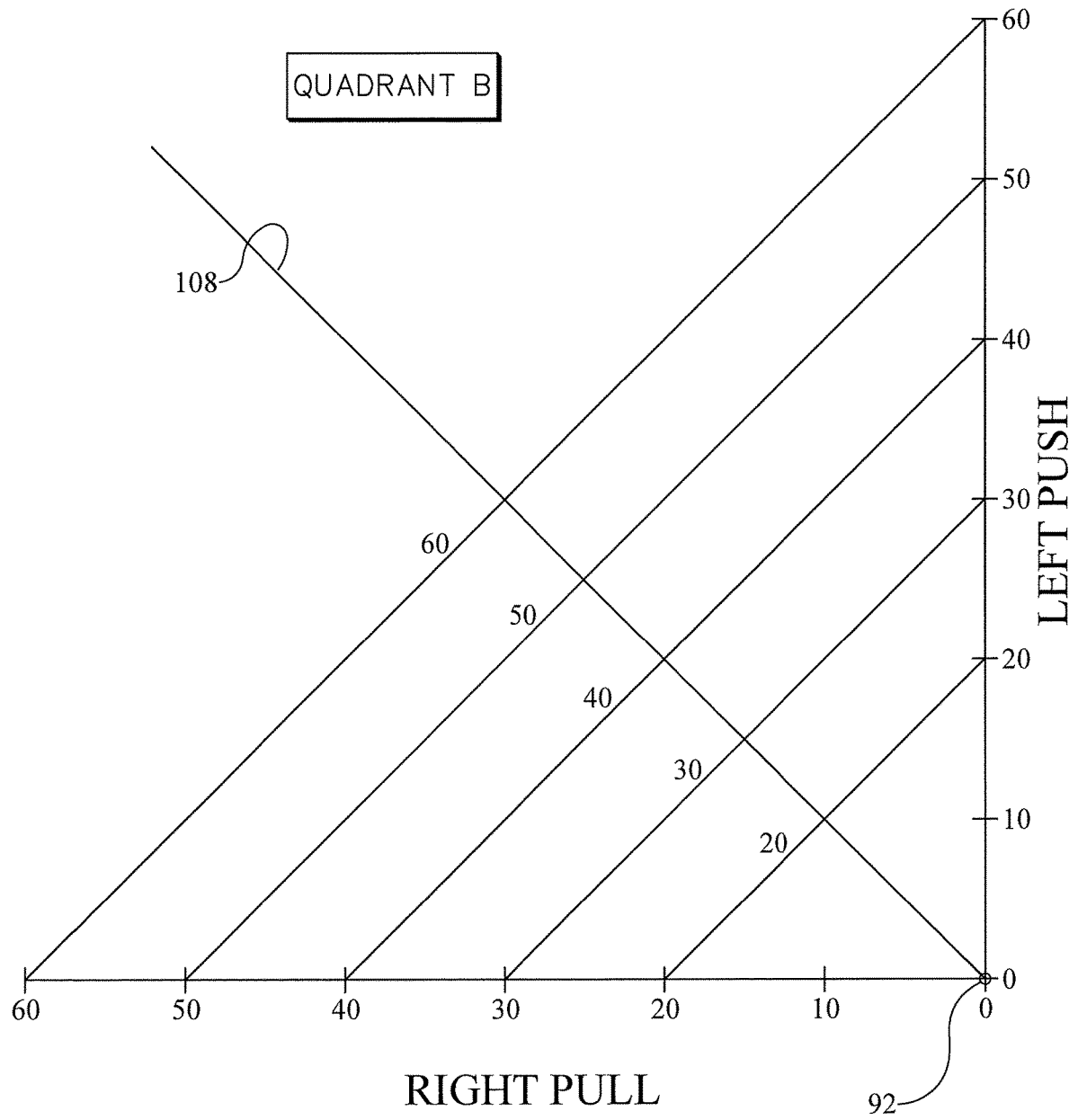

The strength of the applied braking influence depends on the relative magnitudes of the left push force and the right pull force. FIG. 8 is quadrant B of FIG. 6 showing lines of constant turning moment applied to the handles as a result of a user exerting a left pushing force on the left handle and a right pulling force on the right handle. The values shown in FIG. 8 are provided to make the example more concrete, but are not necessarily representative of the forces and moments that would be encountered in practice. Along diagonal 108 the magnitudes of the right pull force and left push force are equal to each other. Above the diagonal the left push force dominates. Below the diagonal the right pull force dominates.

Larger turning moments, either above or below diagonal 108, cause control system 98 to command sharper, smaller radius turns, for example by commanding brake calipers 90 to squeeze tightly against the sidewalls of right rear wheel RR. By contrast, smaller turning moments cause control system 98 to command gentler, larger radius turns, for example by commanding brake calipers 90 to squeeze less tightly against the sidewalls of right rear wheel RR. In general, force combinations further from origin 92 indicate a desire for a more abrupt turn, and force combinations closer to origin 92 indicate a desire for a less abrupt turn.

In quadrant C of FIG. 6, the stretcher is subject to left and right pull forces. Recalling that the diagram of FIG. 6 is for the case of a stretcher moving in the forward direction, the combination of left and right pull forces is taken as an indication that the user wishes to bring the stretcher to a stop or at least reduce its speed. Therefore, instructions 104, when executed by processor 100, cause the deceleration system to apply a decelerating influence which is substantially equal on the left and right sides of the stretcher. This is indicated by the shading applied to all four rolling elements in the schematic plan view of the stretcher. Alternatively, the decelerating influence may be applied substantially laterally equally to only the front rolling elements or to only the rear rolling elements.

In quadrant D of FIG. 6 the stretcher is subject to a combination of push displacement force and pull displacement force, specifically a right push and a left pull. Recalling that the diagram of FIG. 6 is for the case of a stretcher moving in the forward direction, the combination of the left pull and right push forces is taken as an indication that the user wishes to steer the stretcher to the left. Therefore, instructions 104, when executed by processor 100, cause the deceleration system to apply a decelerating influence which is left side dominant, i.e. dominant on the left side of the stretcher. One way to achieve a left dominant decelerating influence is to operate the brake for one of the left side rolling elements, LF, LR. In the schematic example of quadrant D the left side dominance is achieved by applying the decelerating influence to the left rear rolling element as indicated by the shading applied to that element.

Figure 9:
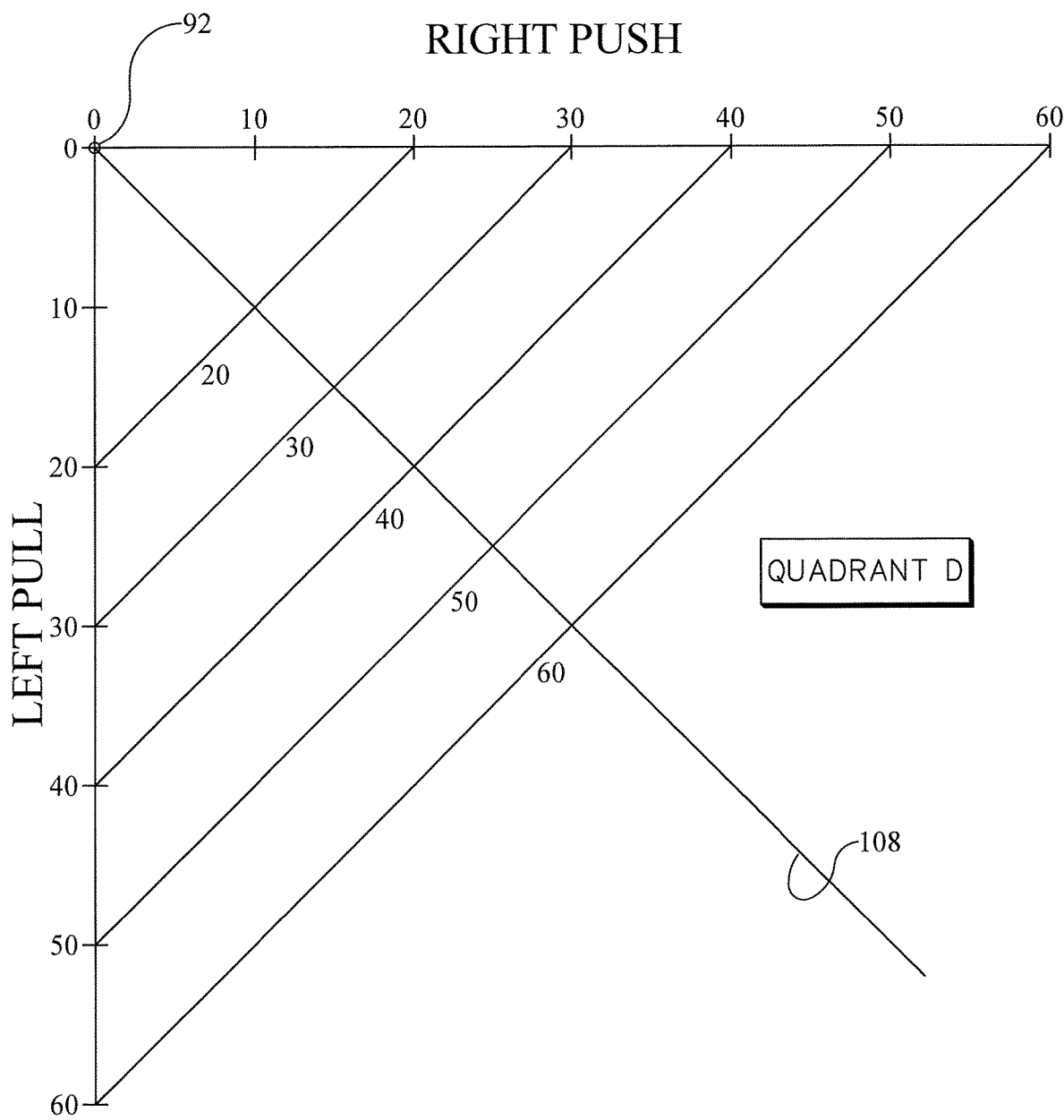

The strength of the applied braking influence depends on the relative magnitudes of the left pull force and the right push force. FIG. 9 is quadrant D of FIG. 6 showing lines of constant turning moment applied to the handles as a result of a user exerting a left pulling force on the left handle and a right pushing force on the right handle. The values shown in FIG. 9 are provided to make the example more concrete, but are not necessarily representative of the forces and moments that would be encountered in practice. Along diagonal 108 the magnitudes of the left pull force and right push force are equal to each other. Above the diagonal the right push force dominates. Below the diagonal the left pull force dominates.

Larger turning moments, either above or below diagonal 108, cause control system 98 to command sharper, smaller radius turns, for example by commanding brake calipers 90 to squeeze tightly against the sidewalls of left rear wheel LR. By contrast, smaller turning moments cause control system 98 to command gentler, larger radius turns, for example by commanding brake calipers 90 to squeeze less tightly against the sidewalls of left rear wheel LR. In general, force combinations further from origin 92 indicate a desire for a more abrupt turn, and force combinations closer to origin 92 indicate a desire for a less abrupt turn.

The act of steering the stretcher has been described as being achieved by applying a decelerating influence to a single rolling element on one side of the stretcher, for example by operating a single brake. However a dominant braking influence on one side or the other can be achieved by applying the decelerating influence to multiple rolling elements as long as the net decelerating influence acts on the rolling elements which will facilitate the desired direction of steering as indicated by the user-applied displacement forces. For example left turning can be accomplished by operating one or both right side brakes gently and operating the selected left side brake more aggressively so that the net decelerating influence is on the left side of the stretcher. Operation of the brakes on multiple wheels may be desirable to achieve an overall deceleration of the stretcher in addition to assisting steering. For example if the processing functions of the control system detect an intent to make a sharp turn, and the stretcher is moving at a high speed (as indicated by a suitable speed sensor and associated processing) it may be desirable to apply a decelerating influence above and beyond that necessary to merely facilitate the turn.

Referring back to quadrant A of FIG. 6, inequality tolerance band $T_I$ is provided so that determination of inequality of left and right push forces is subject to an inequality tolerance. Specifically, the inequality tolerance band helps ensure that unequal left and right push forces trigger the application of a decelerating influence only if the force inequality falls outside the inequality tolerance band. Conversely, an inequality that falls within the band does not result in the application of a decelerating influence. The force inequality tolerance band can also be thought of as a force equality band in view of the fact that forces falling within the band may be considered to be substantially equal.

One example of an inequality that falls within the band, and therefore does not trigger the application of a braking influence, is unequal forces arising from the gait of a caregiver as he or she pushes or pulls the stretcher.

The illustrated inequality tolerance band has a width $W_I$ which increases with increasing force. Other band geometries such as constant width and a width that diminishes with increasing force may also be satisfactory.

The inequality tolerance band, whether of fixed or variable width, may also be made time sensitive, if desired. For example a relatively large inequality that occurs over a relatively shorter interval of time may be interpreted as not indicating an intent to steer the stretcher, and a relatively small inequality which occurs over a relatively longer interval of time may also be interpreted as not indicating an intent to steer the stretcher despite being outside of inequality tolerance band $T_I$.

Figure 10:
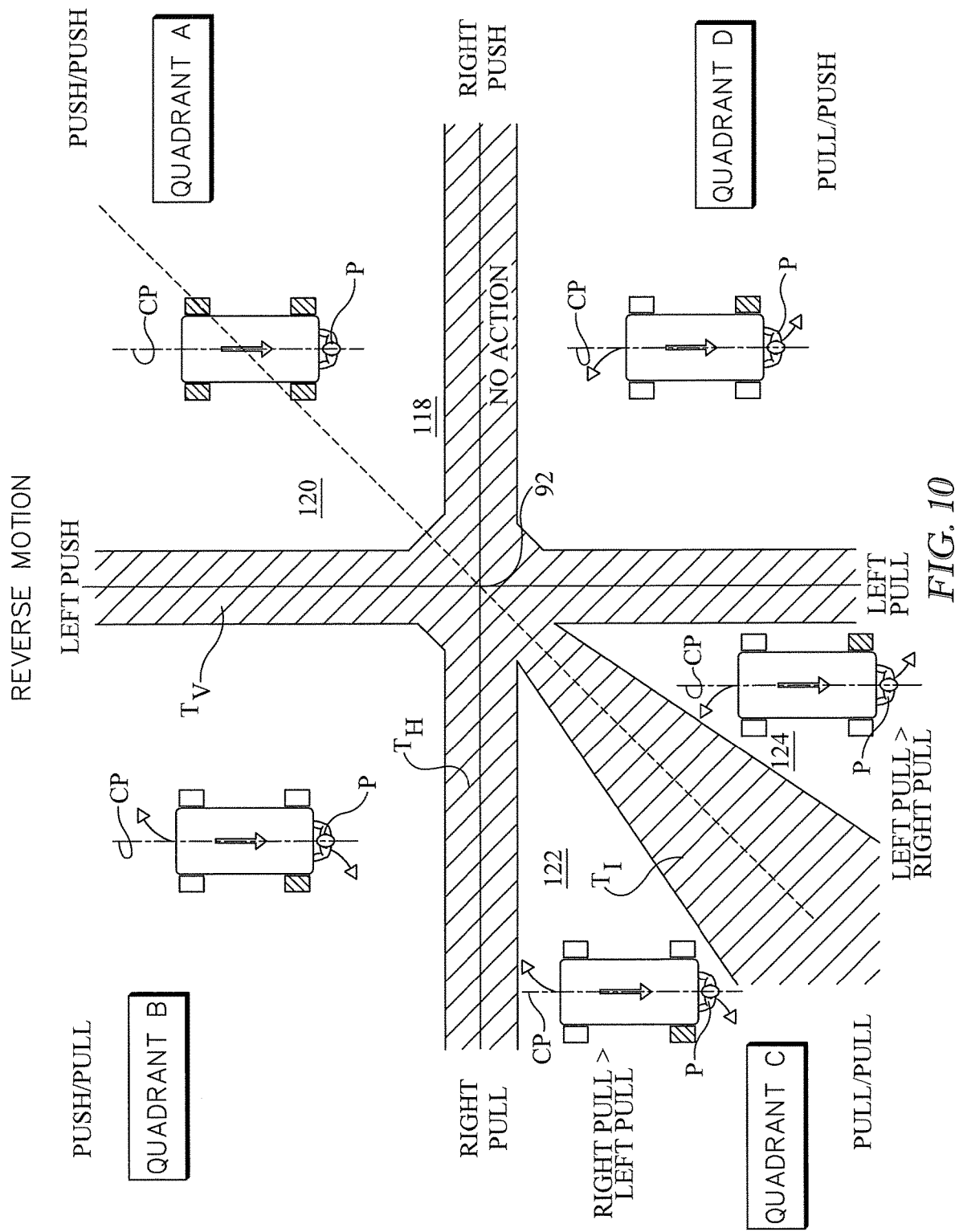
FIG. 10 is a diagram explaining operation of a braking and steering system for a mobile device, such as a stretcher, when the stretcher is moving in a rearward direction.

FIG. 10 is a diagram similar to that of FIG. 6, showing details of the relationship between the displacement force applied to the stretcher and the decelerating influence to be applied to selected rolling elements 42 when the stretcher is moving in the rearward direction (FIGS. 4B and 4D). In operation, machine readable instructions 104, when executed by processor 100, cause the deceleration system to apply the decelerating influence to selected members of the set of rolling elements in response to the sensed displacement force as set forth in Table 2 below.

TABLE 2

| Displacement Force Combination | | Quadrant or Sector | Force Relationship | Application of Decelerating Influence (Stretcher Moving Rearwardly) |
|---|---|---|---|---|
| Left | Right | | | |
| Push | Push | A | | Substantially Equal on Left and Right |
| Push | Pull | B | | Dominant on Left Side |
| Pull | Pull | 122 | Right Pull > Left Pull | Dominant on Left Side |
| Pull | Pull | 124 | Left Pull > Right Pull | Dominant on Right Side |
| Pull | Push | D | | Dominant on Right Side |

Figure 11:
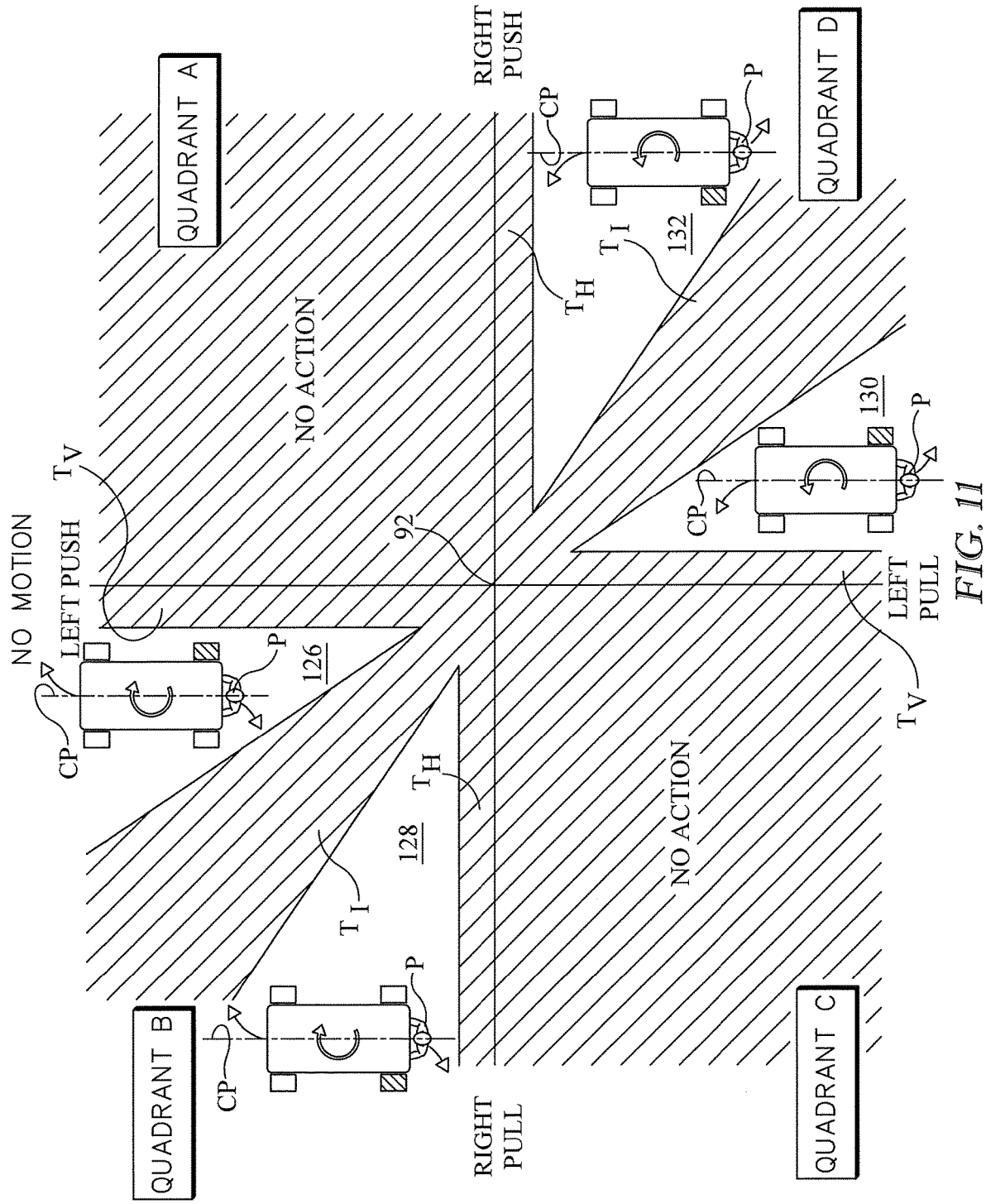
FIG. 11 is a diagram explaining operation of a braking and steering system for a mobile device, such as a stretcher, when the stretcher is substantially translationally immobile.

The discussion and rules of interpretation already given in connection with FIG. 6 also govern FIG. 10. One difference is that on the stretcher schematics of FIG. 10 the shading of the rolling elements in quadrants B, C and D is applied to the leading rolling elements whereas in quadrants A, B, D of FIG. 6 the shading is applied to the trailing rolling elements FIG. 11 is a diagram similar to that of FIG. 6 showing details of the relationship between the displacement force applied to the stretcher and the decelerating influence to be applied to selected rolling elements 42 when the stretcher is being rotated. In other words the stretcher is in an initial condition of being essentially translationally immobile, i.e. not moving forwardly or rearwardly. This corresponds to, for example, a situation in which a caregiver wishes to reorient a stationary stretcher without translating it forwardly or rearwardly, although as a practical matter some incidental forward or rearward translation may occur and/or the caregiver may intend the reorientation to be a prelude to translational movement of the stretcher.

In the interest of consistency of terminology, this application continues its use of the phrase "decelerating influence" and "displacement force" in connection with FIG. 11 and Table 3 even though the stretcher is not initially translating forwardly or rearwardly and even though the user's immediate concern is principally that of reorienting the stretcher rather than moving it in the forward and rearward directions. In connection with FIG. 11 and table 3, "decelerating influence" may be interpreted as the operation of a brake, and "displacement force" may be interpreted as a user provided force exerted horizontally on whatever component of the stretcher is provided to enable a user to translate the stretcher. In addition, the definitions of left, right, forward, rearward, and steering directions are those identified in FIG. 4A.

In operation, machine readable instructions 104, when executed by processor 100, cause the deceleration system to apply the decelerating influence to selected members of the set of rolling elements in response to the sensed displacement force as set forth in Table 3 below.

TABLE 3

| Displacement Force Combination | | Quadrant or Sector | Force Relationship | Application of Decelerating Influence (No Intended Translation) |
|---|---|---|---|---|
| Left | Right | | | |
| Push | Push | A | | None |
| Push | Pull | 126 | Left Push > Right Pull | Dominant on Right Side |
| Push | Pull | 128 | Right Pull > Left Push | Dominant on Left Side |
| Pull | Pull | C | | None |
| Pull | Push | 130 | Left Pull > Right Push | Dominant on Right Side |
| Pull | Push | 132 | Right Push > Left Pull | Dominant on Left Side |

In quadrants A and C no decelerating influence is applied because those quadrants are left push/right push and left pull/right pull quadrants, and a user would not be expected to apply those combinations of force in order to simply reorient the stretcher without intending to also translate it.

In sector 126 of quadrant B the left push force exceeds the right pull force. The predominance of the left push force is taken as an indication that the user wishes to rotate the stretcher clockwisely as seen from above (to the right). A decelerating influence is applied to a rolling element on the side of the stretcher corresponding to the nondominant force, which is the right side. In the schematic example of sector 126 the right side dominance is achieved by applying the decelerating influence to the right rear rolling element as indicated by the shading applied to that element.

In sector 128 of quadrant B the right pull force exceeds the left push force. The predominance of the right pull force is taken as an indication that the user wishes to rotate the stretcher clockwisely as seen from above (to the right). A decelerating influence is applied to a rolling element on the side of the stretcher corresponding to the nondominant force, which is the left side. In the schematic example of sector 128 the left side dominance is achieved by applying the decelerating influence to the left rear rolling element as indicated by the shading applied to that element.

In sector 130 of quadrant D the left pull force exceeds the right push force. The predominance of the left pull force is taken as an indication that the user wishes to rotate the stretcher counterclockwisely as seen from above (to the left). A decelerating influence is applied to a rolling element on the side of the stretcher corresponding to the nondominant force, which is the right side. In the schematic example of sector 130 the right side dominance is achieved by applying the decelerating influence to the right rear rolling element as indicated by the shading applied to that element.

In sector 132 of quadrant D the right push force exceeds the left pull force. The predominance of the right push force is taken as an indication that the user wishes to rotate the stretcher counterclockwisely as seen from above (to the left). A decelerating influence is applied to a rolling element on the side of the stretcher corresponding to the nondominant force, which is the left side. In the schematic example of sector 132 the left side dominance is achieved by applying the decelerating influence to the left rear rolling element as indicated by the shading applied to that element.

In another embodiment the decelerating influence is applied to decelerate the mobile support but not to facilitate steering. Referring back to FIG. 1 the mobile support includes a left rear rolling element LR and a right rear rolling element RR. The support also includes a sensor system 95 adapted to sense displacement force applied to the mobile support, and a deceleration system 97 arranged to apply a decelerating influence to a subset of the rolling elements. Machine readable instructions 104 which, when executed by a processor 100, and provided the bed is moving in a forward direction, command the deceleration system to apply the decelerating influence to selected members of the set of rolling elements in response to substantially equal left and right pull forces. Applying left and right deceleration influences which are approximately equal to each other will help ensure that the stretcher does not pull to one side or the other.

In one variant the "deceleration only" system also operates when the mobile support is moving in the rearward direction. In that case the machine readable instructions, when executed by the processor, and provided the bed is moving in a rearward direction, cause the deceleration system to apply the decelerating influence to selected members of the set of rolling elements in response to substantially equal left and right push forces. Applying left and right deceleration influences which are approximately equal to each other will help ensure that the stretcher does not pull to one side or the other.

For a stretcher having left front, right front, left rear, and right rear rolling elements, the decelerating influence may be applied to the front rolling elements, to the rear rolling elements, or to all four rolling elements.

Particulars of the embodiments that facilitate steering also apply to the "deceleration only" embodiment. Among these are the inequality tolerance $T_I$, the force tolerances $T_H$, $T_V$, and the nonpowered character of the rolling elements.

In view of the foregoing it can be appreciated that a stretcher or other mobile support may include a left front rolling element LF, a right front rolling element RF, a left rear rolling element LR and a right rear rolling element RR. The mobile support also includes a deceleration system 97 arranged to apply a decelerating influence to a subset of the rolling elements. A sensor system 95 sense displacement forces applied to the support. A control system 98 commands application of the decelerating influence to selected members of the set of rolling elements. The selected members are chosen as a function of a lateral imbalance between two displacement forces so that the mobile support tends to follow a desired trajectory.

The desired trajectory has a radius of curvature which increases with diminishing force imbalance. In the limit, the lateral imbalance may have a value of zero and therefore the radius of curvature corresponds to a straight lime trajectory.

The decelerating influence commanded by the control system and effected by the deceleration system may be a function of the state of motion of the stretcher, for example whether the stretcher is moving forwardly, rearwardly, or is translationally immobile.

In view of the foregoing description, various enhancements and modifications may now be better appreciated.

Referring to FIG. 12, an energy conversion device such as an electric generator 150 having leads 152, 154 is mounted by a brackets 156 or by other suitable means to the stretcher 20. Generator drive shaft 160 is connected to an extended axle 46 of caster wheel 42, for example by a spline connection 162. A switch 164 selectively connects one of the generator leads to an electrical load 168. When the wheel rotates about axis 48 in response to the stretcher being moved by a user, axle 46 and shaft 160 turn the generator.

When it is determined that a decelerating influence should be applied to the caster, the control system commands switch 164 to close, thereby applying load 168 to the generator. The application of the load resists rotation of the generator thereby exerting a decelerating influence on the caster.

Figure 13:
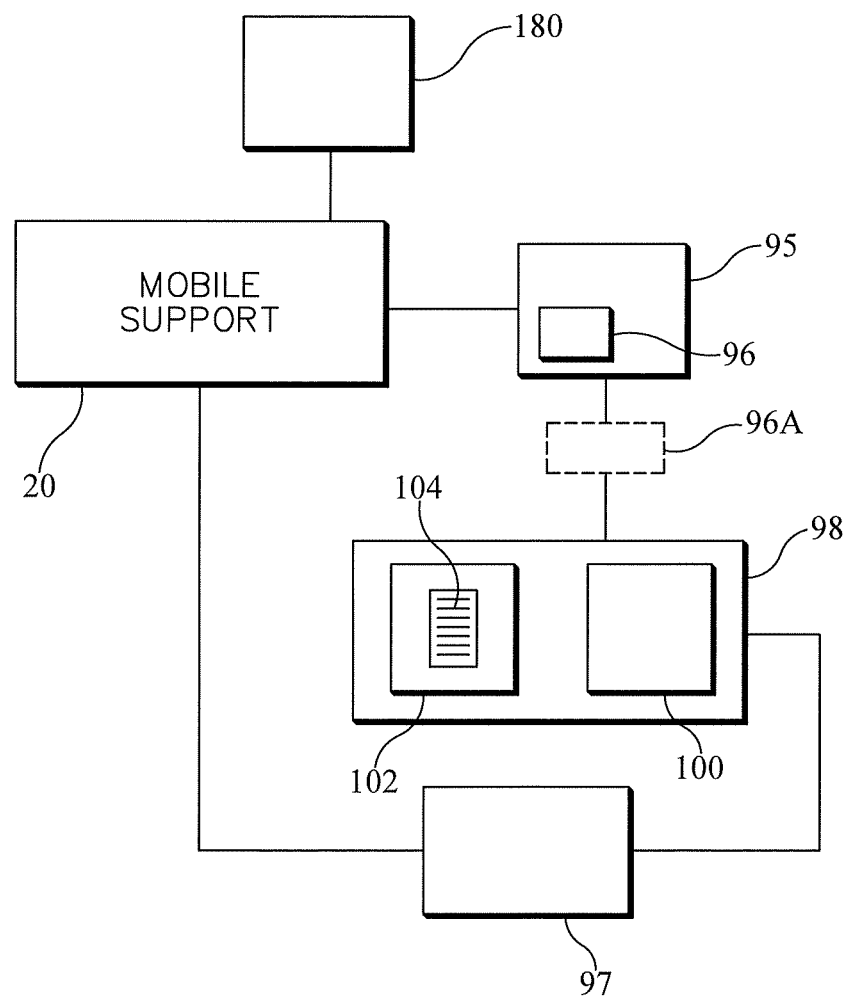
FIG. 13 is a schematic showing an energy harvesting system applicable to the stretcher of FIG. 1.

Referring to FIG. 13, the stretcher may include an energy harvesting system 180. The energy harvesting system harnesses energy that would otherwise be unproductive and channels that harvested energy to a productive use. Examples of components that may be used to harvest energy include gas springs, photoelectric panels, and piezoelectric devices. Further description of these and other energy management arrangements may be found in U.S. Patent Application 62/750,413, entitled "Energy Management for a Stretcher or Other Occupant Support" filed on Oct. 25, 2018, for which U.S. Non-Provisional Application No. 16/659, 696, entitled "Energy Management for a Stretcher or Other Occupant Support," was filed on Oct. 22, 2019, and issued as U.S. Pat. No. 11,241,348, the contents of which are incorporated herein by reference.

In practice the energy required to apply the decelerating influence is the energy harvested by the harvesting system. In this context, applying the decelerating influence includes actions such as squeezing brake calipers 90 against a wheel sidewall, and powering components of sensor system 95 and processor 100.

Figure 14:
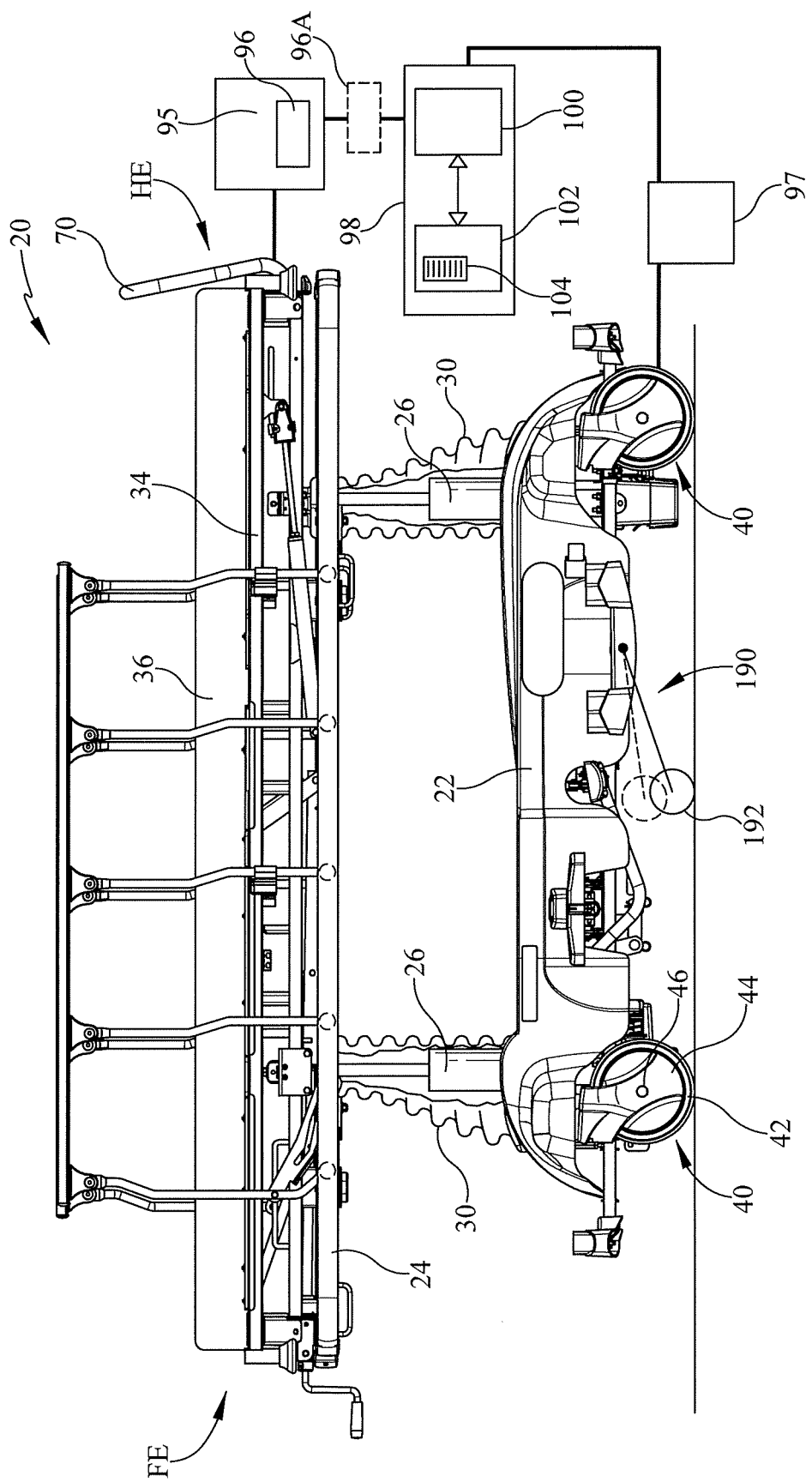
FIG. 14 is a view of a stretcher of the type shown FIG. 1 but which also includes a propulsion unit.

Referring to FIG. 14, the stretcher may include a propulsion unit 190. The schematically illustrated propulsion unit comprises a drive wheel 192 having a deployed state in which the wheel is in contact with the floor (solid lines) and a retracted state in which the wheel is not in contact with the floor (phantom). The wheel is laterally inboard of the left and right rolling elements. One example of a propulsion unit is described in U.S. Pat. No. 7,014,000.

When the wheel is deployed power may be supplied to the propulsion unit to rotate the wheel in order to propel the stretcher or to augment a displacement force exerted by a user. The rolling elements are unpowered, but are otherwise operable for braking or for braking and steering as already described.

Although this disclosure refers to specific embodiments, it will be understood by those skilled in the art that various changes in form and detail may be made without departing from the subject matter set forth in the accompanying claims.

The invention claimed is:

1. A mobile support comprising:
a set of unpowered rolling elements supporting a stretcher including adjustable side rails and a mattress, the set of rolling elements comprising a left rear rolling element and a right rear rolling element;
a sensor system adapted to sense displacement force applied to the support;
a deceleration system arranged to apply a decelerating influence to a subset of the rolling elements;
a processor;
an energy conversion device disposed between at least one rolling element and a frame of the support, the energy conversion device including an extended axle coupled with the at least one rolling element;
machine readable instructions which, when executed by the processor, and provided the mobile support is moving in a forward direction, cause the deceleration system to apply the decelerating influence to selected members of the set of rolling elements in response to the sensed displacement force as set forth below:

| Displacement Force Combination | | | Application of |
|---|---|---|---|
| Left | Right | Force Relationship | Decelerating Influence |
| Push | Push | Right push > Left Push | Dominant on Left Side |
| Push | Push | Left push > Right Push | Dominant on Right Side |
| Push | Pull | | Dominant on Right Side |
| Pull | Pull | | Substantially Equal on Left and Right |
| Pull | Push | | Dominant on Left Side, | wherein a determination of displacement force inequality is subject to an inequality tolerance, and wherein the inequality tolerance increases with increasing displacement force.

2. The mobile support of claim 1 wherein the set of rolling elements includes a left front rolling element and a right front rolling element and the specified decelerating influence is applied predominantly to the rear rolling element or elements.

3. The mobile support of claim 2 wherein the specified decelerating influence specified is applied exclusively to the rear rolling element or elements.

4. The mobile support of claim 1 wherein a determination of whether a displacement force should result in the application of the decelerating influence is subject to a force tolerance.

5. The mobile support of claim 1 including a left handle and a right handle and wherein the sensed displacement force depends on user force exerted on one or both handles.

6. The mobile support of claim 1 wherein the decelerating influence is provided by a mechanical brake.

7. The mobile support of claim 1, wherein energy required to apply the decelerating influence is provided by the energy conversion device.

8. The mobile support of claim 1, wherein application of the decelerating influence is effected by applying a load to the energy conversion device.

9. The mobile support of claim 1 including a propulsion unit.

10. The mobile support of claim 1 in which the machine readable instructions, when executed by the processor, and provided the mobile support is moving in a rearward direction, causes the deceleration system to apply the decelerating influence to selected members of the set of rolling elements in response to the sensed displacement force as set forth below:

| Displacement Force Combination | | | Application of |
|---|---|---|---|
| Left | Right | Force Relationship | Decelerating Influence |
| Push | Push | | Substantially Equal on Left and Right |
| Push | Pull | | Dominant on Left Side |
| Pull | Pull | Right Pull > Left Pull | Dominant on Left Side |
| Pull | Pull | Left Pull > Right Pull | Dominant on Right Side |
| Pull | Push | | Dominant on Right Side. |

11. The mobile support of claim 10 wherein the set of rolling elements includes a left front rolling element and a right front rolling element and the specified decelerating influence is applied predominantly to the rear rolling element or elements.

12. The mobile support of claim 11 wherein the specified decelerating influence is applied exclusively to the rear rolling element or elements.

13. The mobile support of claim 1 in which the machine readable instructions, when executed by the processor, and provided the mobile support is in an initial condition of being substantially translationally immobile, cause the deceleration system to apply the decelerating influence to selected members of the set of rolling elements in response to the sensed displacement force as set forth below:

| Displacement Force Combination | | | Application of |
|---|---|---|---|
| Left | Right | Force Relationship | Decelerating Influence |
| Push | Push | | None |
| Push | Pull | Left Push > Right Pull | Dominant on Right Side |
| Push | Pull | Right Pull > Left Push | Dominant on Left Side |
| Pull | Pull | | None |
| Pull | Push | Left Pull > Right Push | Dominant on Right Side |
| Pull | Push | Right Push > Left Pull | Dominant on Left Side. |

14. The mobile support of claim 13 wherein the set of rolling elements includes a left front rolling element and a right front rolling element and the specified decelerating influence is applied predominantly to the rear rolling element.

15. The mobile support of claim 14 wherein the specified decelerating influence is applied exclusively to the rear rolling element or elements.

16. A mobile support comprising:
a framework including a base and a mattress elevatable relative to the base;

a set of unpowered rolling elements coupled to the framework and comprising a left front rolling element, a right front rolling element, a left rear rolling element and a right rear rolling element;

a support frame;

a set of energy conversion devices, each individual energy conversion device having a drive shaft, wherein one energy conversion device is disposed between each rolling element and the support frame;

a sensor system adapted to sense displacement forces applied to the support;

a deceleration system arranged to apply a decelerating influence to a subset of the rolling elements, wherein the subset of the rolling elements includes at least one of the left front rolling element, the right front rolling element, the left rear rolling element, and the right rear element;

a control system which commands application of a decelerating influence to selected members of the set of rolling elements, the selected members being chosen as a function of a lateral imbalance between two displacement forces so that the mobile support follows a desired trajectory, wherein a determination of displacement force inequality is subject to an inequality tolerance.

* * * * *